Patented Aug. 5, 1952

2,605,821

UNITED STATES PATENT OFFICE 2,605,821

AUTOMATICALLY CONTROLLED BURNER APPARATUS FOR HEATING AUTOMOBILE ENGINES

Henning Waldemar Lindahl, Landskrona, Sweden

Application June 13, 1946, Serial No. 676,392

In Finland February 1, 1941

Section 1, Public Law 690, August 8, 1946
Patent expires February 1, 1961

4 Claims. (Cl. 158—28)

For vehicles driven by combustion engines it has already been proposed to keep the engine warm, when the vehicle is not in use, by heating means comprising a burner for liquid fuel, usually petrol, as the source of heat. In such connection it has also already been proposed to switch on the burner automatically by electrical means, when the engine has stopped running, and to switch off the burner automatically by shutting off the supply of fuel to the same, when the engine is again started. The means hitherto proposed for the purpose in view have not become of any practical importance, however, because they were not so simple and reliable in function as is required.

The object of the present invention is to remedy this disadvantage and to provide improved electrical means for automatically switching on and off the burner which are simple and efficient in operation and particularly applicable in cases where the burner consists of a gasifying burner in which the fuel is gasified by heat and is discharged under pressure in gasified condition through a nozzle into a burner head in which the combustion takes place.

For starting such a gasifying burner pre-heating of the pipe or the like in which the gasification occurs by means of a special source of heat is necessary, in that the heating of this pipe or the like can be carried out by the burner itself only after it has commenced to function. As such special source of heat it is well-known to use an electrical heating element, and it is a further object of the invention to provide means for automatically switching on and off said element when required.

Figure 1:
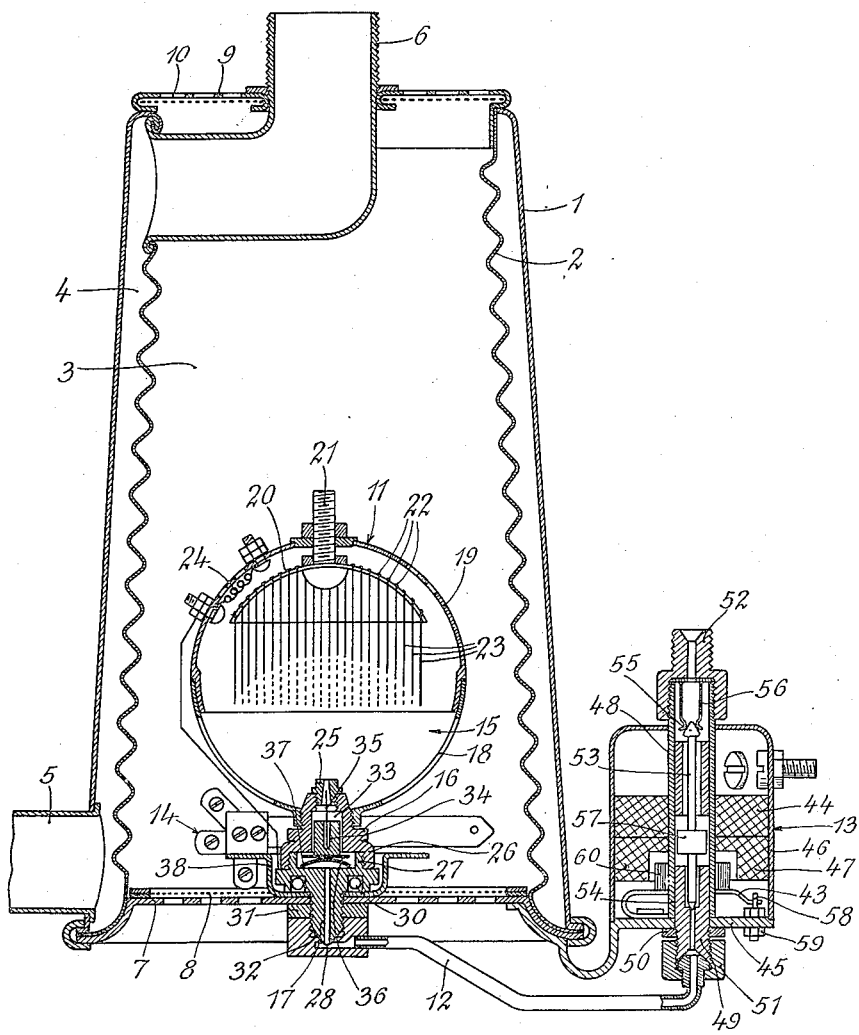
Figure 6:
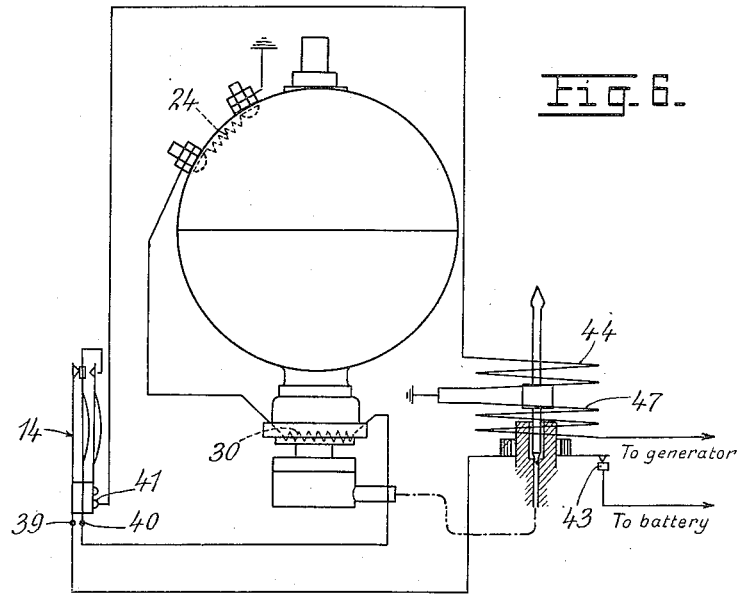

The invention will be described in more detail with reference to the accompanying drawings which, partly diagrammatically, illustrate an embodiment of the invention and in which:

Figure 1 shows in section the assemblage of the apparatus according to the invention, Figure 2 to 5 diagrammatically show thermostatic means in various positions, and Figure 6 is a circuit diagram of the apparatus.

Referring to Figure 1 in the drawings, 1 is an outer sheath and 2 an inner corrugated wall which divides the interior of said sheath into an inner heating chamber 3 and a surrounding annular jacket 4. The latter is connected in the cooling water system of an internal combustion engine by means of an inlet connection piece 5 at the bottom end of the sheath 1 and an outlet connection piece 6 at the upper end thereof. In the heating chamber 3, which is bounded at the bottom by a perforated bottom wall 7 provided with a safety net 8 and at the top by a perforated cover 9 provided with a safety net 10, a burner 11 is mounted which will be described more in detail in the following and which communicates through channel means mounted in the bottom wall 7 with a fuel supply conduit 12. This conduit further passes through an electromagnetically controlled valve device 13 which is mounted at the side of the sheath 1 or at any other suitable place. The control of the movements of the valve takes place in response, on the one hand, to the running or standstill condition of the engine and, on the other hand, to the temperature conditions in the heating chamber 3, which for this purpose encloses a thermostatic contact device 14 which is connected in the circuits of the valve as will be described with reference to Figures 2 to 5.

The burner 11 consists of a ball-shaped burner head 15 and a nozzle 16 which latter is associated with the above-mentioned channel means which is in the form of a channel plug 17. The whole burner is thereby supported by the bottom wall 7 of the heating chamber 3. The burner head 15 is composed of a lower cup-shaped part 18 which has a screw-threaded hole in its bottom with which it is screwed on to the nozzle 16, and of an upper reversed cup-shaped part 19 which rests by means of a ledge around its periphery on the edge of the first-mentioned part 18. The upper part 19 is perforated or otherwise cut through at its top to provide an outlet for the combustion gases from the interior of the burner head 15. At the top of the part 19 a support in the form of a curved metal plate 20 is mounted by a central bolt 21, said plate being provided with a great number of holes 22. In these holes the legs of hair-pin wires 23, preferably of fireproof steel alloy, are inserted, so that said wires are thereby suspended from the support 20 and hang down in the interior of the burner head 15. For igniting the burner a filament 24 intended to be heated electrically is provided within the burner head 15.

The nozzle 16 projects a little distance upwardly into the burner head 15, and at its upper end a nozzle end piece 25 is screwed in which is provided with a fine passage. The lower end of the nozzle has an internally screw-threaded flange 26 with which it is screwed on to a corresponding flange 27 on the upper end of the channel plug 17. The latter which has an axial channel or passage 28 for the fuel supply is further, in a peripheral groove 29 in the part thereof located within the heating chamber 3, provided with a heating coil 30 of resistance wire. The channel plug 17, and thereby the whole burner 11, is secured by means of a nut 31 which is screwed on to the outer screw-threaded end thereof. The fuel supply conduit 12 is connected to the channel plug 17 by means of a cap nut 32 which is screwed on to the latter outside the nut 31. In the inner hollow 33 of the nozzle 16 a body 34 is movable which supports a cleaning needle 35 directed upwardly towards the nozzle end piece 25 and which normally rests on a washer 36 loosely lying below the same in a space 37 between the nozzle 16 and the channel plug 17. This washer is preferably circular, and it is so made from bimetal that at normal temperature it is curved in one direction but when exceeding a certain temperature reverses to become curved in the opposite direction to reverse again and become curved in the first direction when being cooled below said temperature. The reversal occurs so suddenly and with such a force that the washer jumps up from its support and throws the body 34 upwardly in the nozzle hollow 33, so that the cleaning needle 35 fastened on the body 34 is pushed up through the opening in the nozzle end piece 25 and cleans the same. Due to its weight the body 34 immediately falls back again into its position of rest, so that said opening is shut off by the cleaning needle 35 only for a short moment. At the ignition of the burner the heating of the nozzle 16 taking place thereby is sufficient to reverse the bimetallic washer 36 from curvature in one direction to curvature in the other direction, and accordingly cleaning of the nozzle will occur at every ignition of the burner. At the extinguishing of the burner and the ensuing cooling of the nozzle below the temperature at which the bimetallic washer 36 was reversed in the way indicated above the washer is again reversed, and cleaning of the nozzle again takes place. Thus the nozzle will be cleaned practically after every extinguishing of the burner and at the beginning of every new ignition of the same.

The thermostatic contact device 14 is placed adjacent the burner 11 in the heating chamber 3 on a support 38 which consists of a cup-shaped element clamped between the channel plug 17 and the bottom wall 7. The contact device is thereby subjected to the action of heat from the burner 11 as well as from the heating resistance 30. It consists, as is best seen in Figures 2 to 5, of a contact spring 39, preferably of Phosphor bronze, a bimetallic contact spring 40 having a biasing bow element, and a contact spring 41, preferably of Phosphor bronze and provided with a biasing bow element, the bimetallic spring 40 lying between the two other contact springs 39 and 41 cooperating therewith and being provided with an insulated hook 42 for co-operation with the contact spring 41. The contact spring 39 is connected through a normally closed switch 43 which is located within the casing of the valve 13, with one terminal of a current source, usually the ordinary battery of the motor vehicle. To the other terminal of the current source the bimetallic contact spring 40 is connected through the heating coil 30 and the filament 24, and to the last mentioned terminal of the current source the contact spring 41 is connected through a magnet coil 44 in the valve device 13.

The valve device 13 comprises a bracket 45 and a casing 46 mounted thereon, said casing enclosing the above-mentioned coil 44 as well as another coil 47 situated below the former and connected to the electrical generator of the motor vehicle or in any other way so as to be energized as soon as the engine starts. The two coils surround a tube 48 which extends vertically through the interior of the casing 46 and which is connected at its bottom to a channel plug 49 in the bracket 45 and projects at its top through the casing. The outer end of the channel plug 49, which has an axial channel 50, is connected by means of a cap nut 51 with the fuel supply conduit 12, and the upper end of the tube 48 is provided with a connection piece 52 for another conduit (not shown) coming direct from the fuel supply. Within the tube 48 a rod core 53 is provided freely movable. The lower end of the core, which is guided in a bushing 54 within the tube, is formed as a valve needle which is intended to shut off the channel 50 when the core occupies its lowest position, and the upper end of the core is formed with a thickened portion 55 which is intended to be engaged by a spring clamp 56 at the upper end of the tube 48 when the core is raised into its uppermost position. Intermediate its end the core 53 is provided with a cylindrical soft iron piece 57 which is situated so as to be attracted by either coil 44 or 47. The above mentioned switch 43 consists of a contact spring which is fixed to the bracket 45 and with a contact member 58 normally engages the head of a clamping screw 59 to which a lead to the current source is connected. The contact spring 43 is connected by a lead with the heating coil 30 of the burner 11 and carries an armature 60 which surrounds the tube 48 and can be attracted by the lower coil 47, whereby it is raised into a recess suited therefor in said coil.

The complete circuit of the apparatus as described above is shown in Figure 6.

Figure 2:
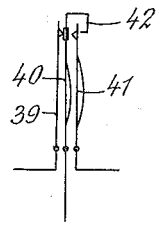
Figure 3:
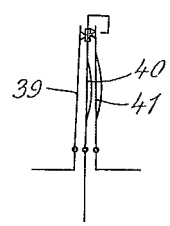
Figure 4:
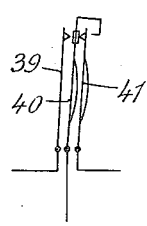
Figure 5:
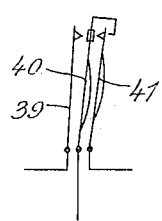

The operation of the apparatus is as follows. As soon as the engine is started the coil 47 is energized and draws the core 53 downwardly and the armature 60 upwardly, the valve being closed, the fuel supply to the burner 11 shut off and the battery current to the contact spring 39 interrupted by the switch 43. The burner 11 is maintained fully out of action as long as the engine is running. When the engine is stopped the current through the coil 47 ceases, and then the switch 43 connects the contact spring 39 to the battery. As soon as the temperature in the neighborhood of the bimetallic contact device 14 has sunk below a predetermined point, the bimetallic contact spring 40 engages the contact spring 39, as shown in Figure 2, whereby the heating coil 30 and the filament 24 are connected in circuit. When the pre-heating produced by the heating coil is sufficient, the bimetallic contact spring 40, while maintaining its engagement with the contact spring 39, engages the contact spring 41, as shown in Figure 3. Thereby the coil 44 in the valve device 13 is connected in circuit; it lifts the core 53 and opens the valve, so that fuel is admitted through the conduit 12 to the burner nozzle 16 where it is gasified by the heat from the coil 30, the nozzle 16 and the heating coil 30 comprising fuel gasifying means. The burner 11 is then brought into operation, in that the gasified fuel discharged through the nozzle 16 is ignited within the burner head 15 by the filament 24 provided therein. After the burner has thus been brought into operation the temperature in the neighborhood of the bimetallic contact device 14 increases, and when the bimetallic contact spring 40 as a consequence bends further, it passes the unstable position of equilibrium of its bow element, so that this bow element which hitherto, by its inherent tension, has tended to bend the contact spring 40 towards the contact spring 39 reverses the direction of its action and suddenly bends free of the contact spring 39 and simultaneously bends the contact spring 41 which thereby also passes the unstable position of equilibrium of its bow element. The position now occupied by the contact device is shown in Figure 4. At the cessation of the contact between the contact springs 39 and 40 the heating coil 30, the filament 24 and the magnet coil 44 are disconnected. At the disconnection of the latter the core 53 remains in its valve-opening position, until the magnet coil 47 is again energized, by the spring clamp 56 holding the thickened portion 55 of the core. The bimetallic spring 40 naturally remains out of engagement with the contact spring 39, as long as the burner is in operation or the temperature in the neighborhood of the contact device otherwise remains at a sufficient height. When the engine has been running and the burner as a consequence thereof has been out of action, the temperature will fall after stopping the engine. The bimetallic spring 40 then, in passing the unstable position of equilibrium of its bow element, bends in the opposite direction towards the contact spring 39 and by the hook 42 returns also the contact spring 41 through the position of equilibrium of its bow element, as will be seen in Figure 5, so that the position shown in Figure 2 is again reached.

I claim:

1. An apparatus of the type described, comprising means forming a heating chamber, burner means mounted within said chamber, fuel gasifying means provided in said burner means including electrical heating means, a conduit adapted to lead from a fuel supply and connected to said gasifying means, electromagnetic valve means connected in said conduit and comprising reciprocable core means, a valve closing element on said core means, two axially disposed magnetic coils surrounding said core means for alternately actuating the same in the valve opening and closing directions, respectively, one said coil being adapted to be connected in the generator circuit of an automobile engine to which the apparatus is applied and upon energization thereof moving said core to valve closing position, said coil being energized only during operation of said engine, and thermostatic means for switching on and off said electrical heating means and for controlling the energization of the valve opening coil in response to the temperature in the neighborhood of said burner means, said opening coil of said electromagnetic valve means being energized by said thermostatic means to move said valve means in a conduit opening direction when the heat in said chamber reaches a predetermined temperature, said heating means being energized by said thermostatic means when heat in said chamber reaches a temperature below a predetermined temperature.

2. An apparatus of the type described, comprising means forming a heating chamber, burner means mounted within said chamber, fuel gasifying means including electrical heating means provided in said burner means, a conduit adapted to lead from a fuel supply and connected to said gasifying means, valve means connected in said conduit, electrical switch means connected in the circuit of said electrical heating means, electromagnetic means comprising two axially disposed magnetic coils and a movable core for operating said valve means and said switch means, one said coil being adapted to be connected in the generator circuit of an automobile to which the apparatus is applied and upon energization thereof moving said core to valve closing position and said switching means to circuit opening position, and thermostatic means for switching on and off said electrical heating means and for controlling the energization of the valve opening coil of said valve means in response to the temperature in the neighborhood of said burner means, said opening coil of said electromagnetic valve means being energized by said thermostatic means to move said valve means in a conduit opening direction when the heat in said chamber reaches a predetermined temperature, said heating means being energized by said thermostatic means when heat in said chamber reaches a temperature below a predetermined temperature.

3. An apparatus of the type described, comprising means forming a heating chamber, burner means mounted within said chamber, fuel gasifying means including electrical heating means provided in said burner means, a conduit adapted to lead from a fuel supply and connected to said gasifying means, electromagnetic valve means connected in said conduit and comprising reciprocable core means, a valve closing element on said core means for coacting with said conduit, two axially disposed magnetic coils surrounding said core means for alternately actuating the same in the valve opening and closing directions, respectively, one said coil being adapted to be connected in the generator circuit of an automobile to which the apparatus is applied and upon energization thereof moving said core to valve closing position, electrical switch means having an armature thereon and operatively associated with the valve closing coil of said electromagnetic valve means and connected in the circuit of said electrical heating means, said switch means being opened on energization of said one said coil by action of said armature, and thermostatic means for switching on and off said electrical heating means and for controlling the energization of the valve opening coil in response to the temperature in the neighborhood of said burner means, said opening coil of said electromagnetic valve means being energized by said thermostatic means to move said valve means in a conduit opening direction when the heat in said chamber reaches a predetermined temperature, said heating means being energized by said thermostatic means when heat in said chamber reaches a temperature below a predetermined temperature.

4. An apparatus of the type described, comprising means forming a heating chamber, burner means mounted within said chamber, fuel gasifying means including electrical heating means provided in said burner means, a conduit adapted to lead from a fuel supply and connected to said gasifying means, electromagnetic valve means connected in said conduit and having a closing coil adapted to be connected in an automobile generator circuit and operable to closed position upon energization of said generator, electrical switch means operatively associated with said electromagnetic valve means and connected in the circuit of said electrical heating means for opening said circuit when said valve closes, and thermostatic means in said heating chamber connected in circuit with said electrical heating means and with a valve opening coil of said valve means to control the operation thereof in response to the temperature in the neighborhood of said burner means, said opening coil of said electromagnetic valve means being energized by said thermostatic means to move said valve means in a conduit opening direction when the heat in said chamber reaches a predetermined temperature, said heating means being energized by said thermostatic means when heat in said chamber reaches a temperature below a predetermined temperature, said electrical switch means and said thermostatic means being connected in series.

HENNING WALDEMAR LINDAHL.

REFERENCES CITED

The following references are of record in the file of this patent:

UNITED STATES PATENTS

| Number | Name | Date |
|---|---|---|
| 2,074,168 | Danuser et al. | Mar. 16, 1937 |
| 2,110,222 | Hammers et al. | Mar. 8, 1938 |
| 2,117,108 | Spencer | May 10, 1938 |
| 2,159,257 | Danuser et al. | May 23, 1939 |
| 2,286,853 | Holthouse | June 16, 1942 |

FOREIGN PATENTS

| Number | Country | Date |
|---|---|---|
| 406,321 | Canada | July 28, 1942 |
| 545,957 | Great Britain | June 19, 1947 |